(12) United States Patent
Herbert et al.

(10) Patent No.: US 11,492,476 B2
(45) Date of Patent: Nov. 8, 2022

(54) PUPUNHA-REINFORCED POLYPROPYLENE COMPOSITE

(71) Applicant: Ford Global Technologies, LLC, Dearborn, MI (US)

(72) Inventors: Cristiano Grings Herbert, Salvador (BR); Rodrigo Denizarte de Oliveira Polkowski, Camaçari (BR); Cristiane Carla Gonçalves, Lauro de Freitas (BR); Angelo Nogueira Aguiar, Lauro de Freitas (BR); Jodalva Guimarães Freire de Souza, Salvador (BR); Helano Lima dos Santos, Camaçari (BR); Oberti dos Santos Almeida, Salvador (BR); Alper Kiziltas, Sarikamis (TR); Paulo Roberto Tavares Oliveira, Salvador (BR); Fernando Martins Rezende, Salvador (BR)

(73) Assignee: Ford Global Technologies, LLC, Dearborn, MI (US)

( * ) Notice: Subject to any disclaimer, the term of this patent is extended or adjusted under 35 U.S.C. 154(b) by 268 days.

(21) Appl. No.: 16/816,649

(22) Filed: Mar. 12, 2020

(65) Prior Publication Data
US 2021/0284831 A1    Sep. 16, 2021

(51) Int. Cl.

| C08L 23/12 | (2006.01) |
| C08L 1/02 | (2006.01) |
| D01B 1/50 | (2006.01) |
| B29C 48/40 | (2019.01) |
| D21B 1/06 | (2006.01) |
| B29C 48/00 | (2019.01) |
| B29B 9/14 | (2006.01) |
| B29B 9/06 | (2006.01) |
| B29C 48/04 | (2019.01) |
| C08J 5/04 | (2006.01) |
| B29K 1/00 | (2006.01) |
| C08K 7/02 | (2006.01) |
| B29K 23/00 | (2006.01) |

(52) U.S. Cl.
CPC ............... *C08L 23/12* (2013.01); *B29B 9/06* (2013.01); *B29B 9/14* (2013.01); *B29C 48/022* (2019.02); *B29C 48/04* (2019.02); *B29C 48/40* (2019.02); *C08J 5/045* (2013.01); *C08L 1/02* (2013.01); *D01B 1/50* (2013.01); *D21B 1/061* (2013.01); *D21B 1/063* (2013.01); *B29K 2001/00* (2013.01); *B29K 2023/10* (2013.01); *C08J 2301/02* (2013.01); *C08J 2323/12* (2013.01); *C08K 7/02* (2013.01); *C08K 2201/005* (2013.01)

(58) Field of Classification Search
CPC .. C08L 23/12; C08L 1/02; C08J 5/045; D01B 1/50; B29C 48/40; B29C 48/022; B29C 48/04; C08K 7/02; D21B 1/063; D21B 1/061; B29B 9/14; B29B 9/06
USPC .......................................................... 524/9
See application file for complete search history.

(56) References Cited

U.S. PATENT DOCUMENTS

| 6,756,412 B2 | 6/2004 | Muzzy |
| 8,309,006 B2 | 11/2012 | Kawashiri |
| 2006/0261508 A1 | 11/2006 | Lustiger et al. |
| 2017/0174404 A1 | 6/2017 | Ragot et al. |

FOREIGN PATENT DOCUMENTS

| BR | PI1103362 A2 | 8/2015 |
| BR | 102017019539 A2 | 4/2019 |
| CN | 101065526 A | 10/2007 |
| CN | 102317365 A | 1/2012 |
| CN | 102896843 A | 1/2013 |
| CN | 104204073 A | 12/2014 |
| CN | 10669377 A | 5/2017 |
| EP | 0784074 A1 | 7/1997 |
| WO | 2006112599 A1 | 10/2006 |
| WO | 2006130939 A2 | 12/2006 |
| WO | 2014147103 A1 | 9/2014 |

OTHER PUBLICATIONS

Magalhaes et al., J. Appl. Polym. Sci., 1285-1294, 2013. (Year: 2013).*
Silva et al., Composites Part B, 129, 117-123, 2017. (Year: 2017).*
Santos et al., Journal of Reinforced Plastics and Composites, 27, 16-17, 1805-1816, 2008. (Year: 2008).*

* cited by examiner

*Primary Examiner* — Hui H Chin
(74) *Attorney, Agent, or Firm* — Vincent Mastrogiacomo; McCoy Russell LLP

(57) ABSTRACT

Methods and systems are provided for a composite material. In one example, the composite material includes a polymer base reinforced with a powder formed from pupunha fibers. The resulting composite material is provided as pellets for further processing.

20 Claims, 13 Drawing Sheets

PUPUNHA-REINFORCED POLYPROPYLENE COMPOSITE

FIELD

The present description relates generally to methods and systems for making and using a composite material. Specifically, a composite material comprising peach palm fibers.

BACKGROUND/SUMMARY

Polymer composites are multiphase solid materials in which reinforcing fillers are integrated with a polymer matrix, resulting in synergistic mechanical properties that cannot be achieved from either component alone. For example, in glass fiber reinforced polypropylene (PP), the glass fibers increase the strength and stiffness of the PP without imposing additional weight to any structure formed from the resulting polymer composite. These synergistic mechanical properties make polymer composites highly versatile. However, current polymer composites may have drawbacks. For example, the glass fibers may be abrasive and degrade manufacturing equipment, while fabrication of the glass may release undesirable emissions to the atmosphere. There is therefore increased interest in utilizing sustainable, renewable materials for various industrial applications, which has motivated efforts to incorporate natural fibers as reinforcing agents for polymer composites.

The inventors have recognized that renewable materials are not without their drawbacks. As an example, homogeneous dispersion of natural fibers into the polymer and adhesion between the composite components may be challenging due to distinct differences in material properties of the polymer versus the natural fibers. Furthermore, incorporation of the natural fibers as filaments, whether long or short, may introduce directional bias in the targeted mechanical properties of the resulting composite material. For example, the composite material may have increased stiffness in a direction along which the fiber filaments are aligned and reduced stiffness in a perpendicular direction. Entangling the fibers within the polymer may create a composite material with more uniform properties, but may limit a number of processing techniques which may be applied to the composite material to form products with a high degree of structural complexity. Furthermore, the resulting composite material may not have an aesthetically appealing finish and appearance.

In one example, the issues described above may be at least partially addressed by a composite material comprising a polymer base and a fine powder formed from dried and milled pupunha fibers. In some examples, the pupunha fiber may be milled to form a powder of fibrils, the fibrils being structural biological materials with rod-like structures with smaller dimensions than the fibers. At least a portion of the fibers may be obtained from a shell of a stem of a pupunha palm, the shell including cellulose micrometric fibrils. Furthermore, a portion of the powder may also include pupunha leaves with embedded crosslinked fibers. The fibers may have lengths of approximately 2-5 mm, widths of approximately 1-4 mm, and thicknesses of 0.2-0.5 mm. In some examples, the fibers may have diameters of up to approximately 2 μm and lengths up to approximately 5 mm. The cellulose micrometric fibrils from the shell may have thicknesses, for example, of less than 1 μm, widths of approximately 10 μm, and lengths of approximately 400 μm. In this way, a low cost polymer composite with desired mechanical and chemical properties and an attractive appearance is provided which may be processed by a variety of manufacturing techniques.

As one example, the shells of pupunha palm stems (and leaves) may be milled into a powder and dispersed into polypropylene or other suitable polymers. By incorporating the pupunha shells and leaves as a powder, cohesion between the pupunha fibers and the polypropylene may be increased in comparison to incorporation of whole, e.g., unmilled fibers. The resulting polymer composite may be extruded into pellets that may then be used to form structures via fabricating techniques such as injection molding. Such composites can be used for a variety of different purposes in a variety of different fields including automotive, aerospace, construction, sports, shipbuilding, chemical and special engineering, medicine and the like. For example, polymer composites may be used to form automotive components, such as interior panels, consoles, inserts, etc.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1, 8-9, and 11-12 are shown approximately to scale.

DETAILED DESCRIPTION

Figure 1:
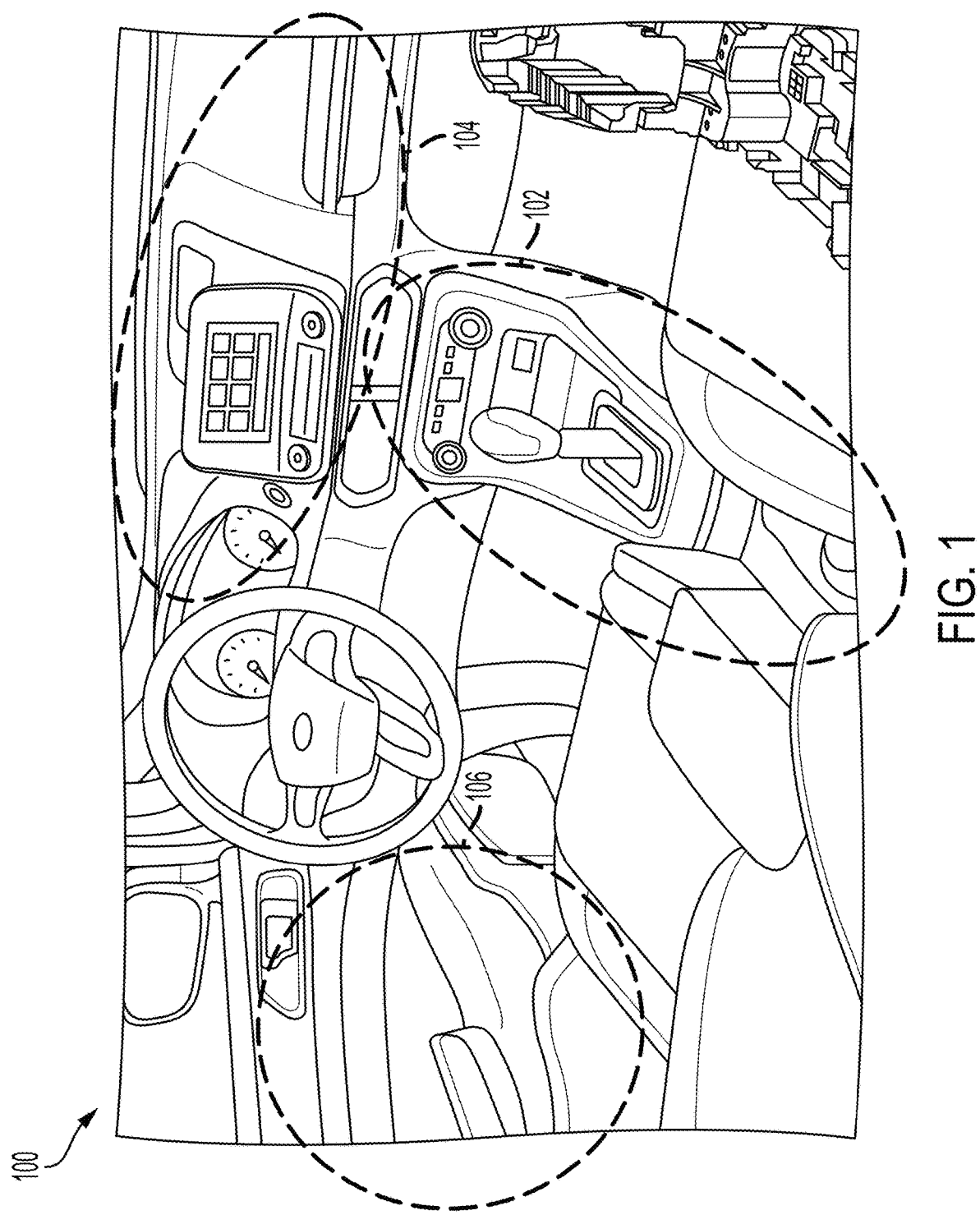
FIG. 1 shows an example of an automobile interior with components which may formed of a polymer composite.
Figure 2:
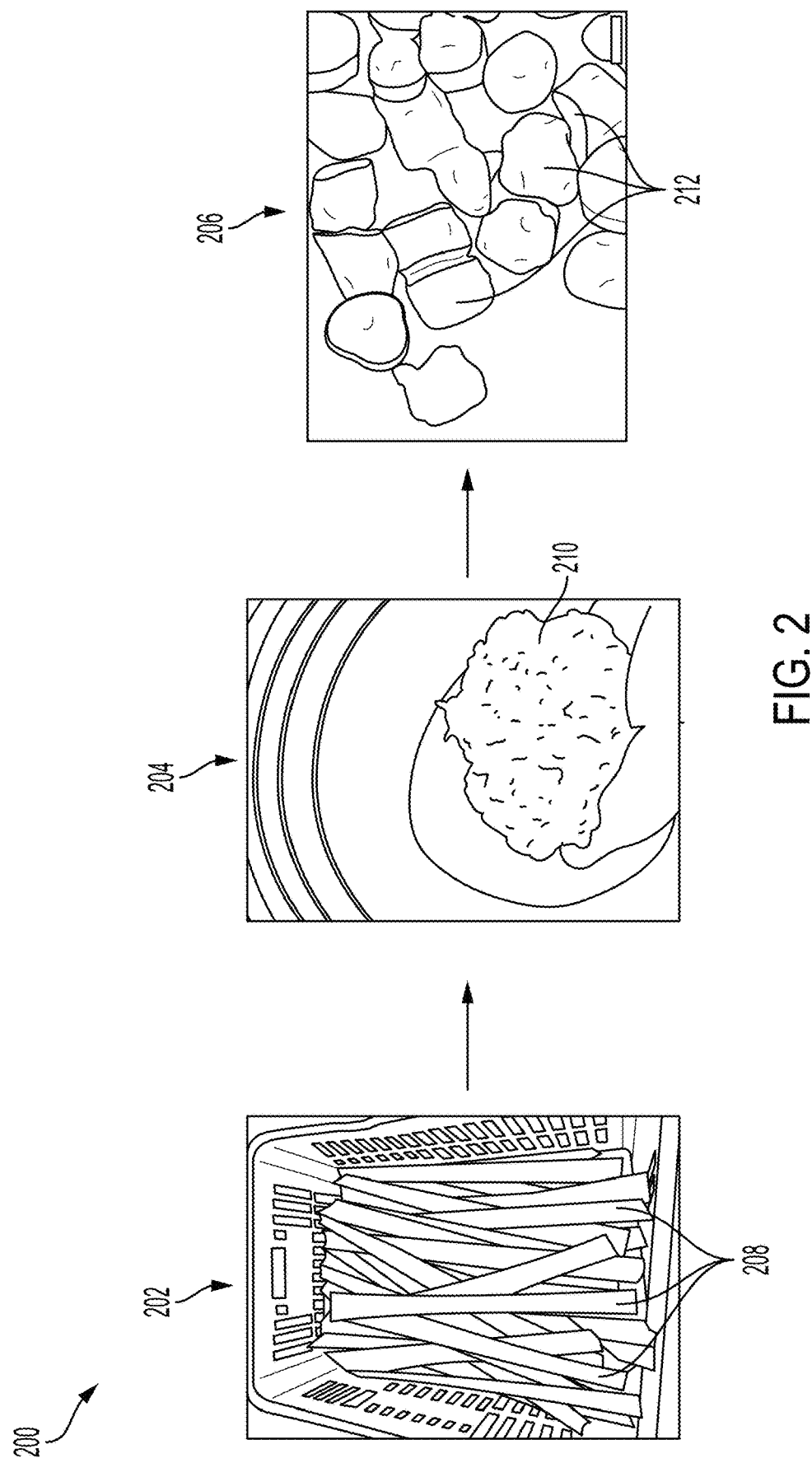
FIG. 2 shows a cartoon depicting steps in the processing of pupunha fibers to form the polymer composite.
Figure 3:
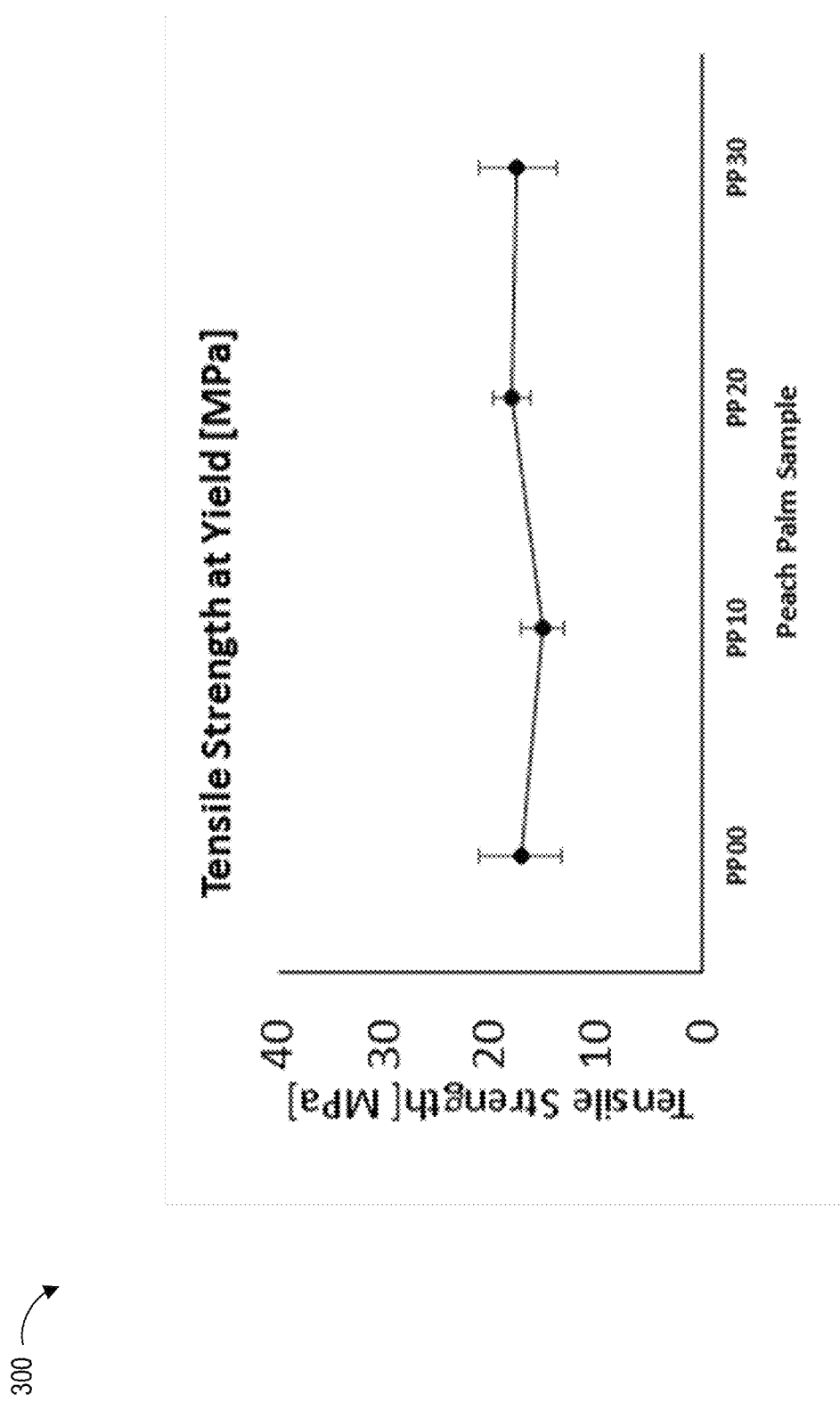
FIG. 3 shows a first graph plotting tensile strength yield of polymer composites comprising varying amounts of pupunha fiber.
Figure 8:
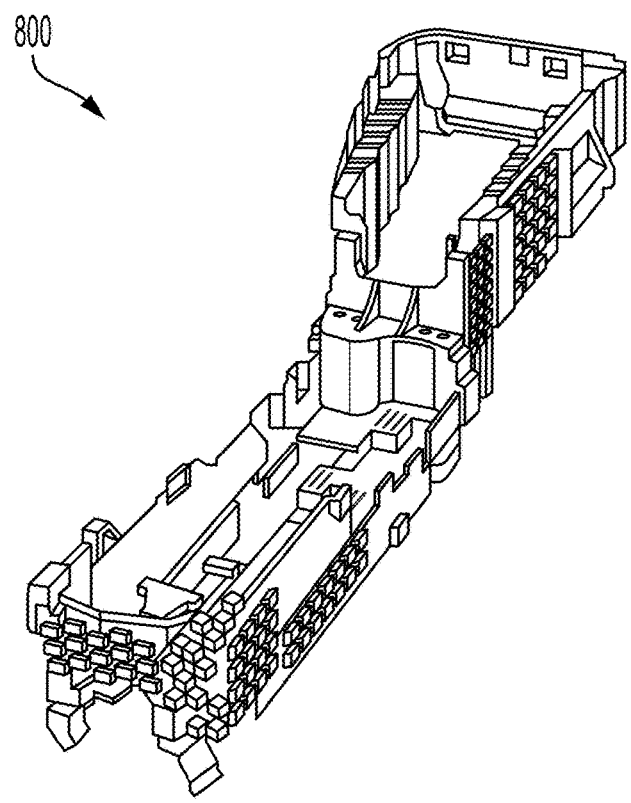
FIG. 8 shows a first example of a structure which may be formed using an embodiment of the polymer composite.
Figure 9:
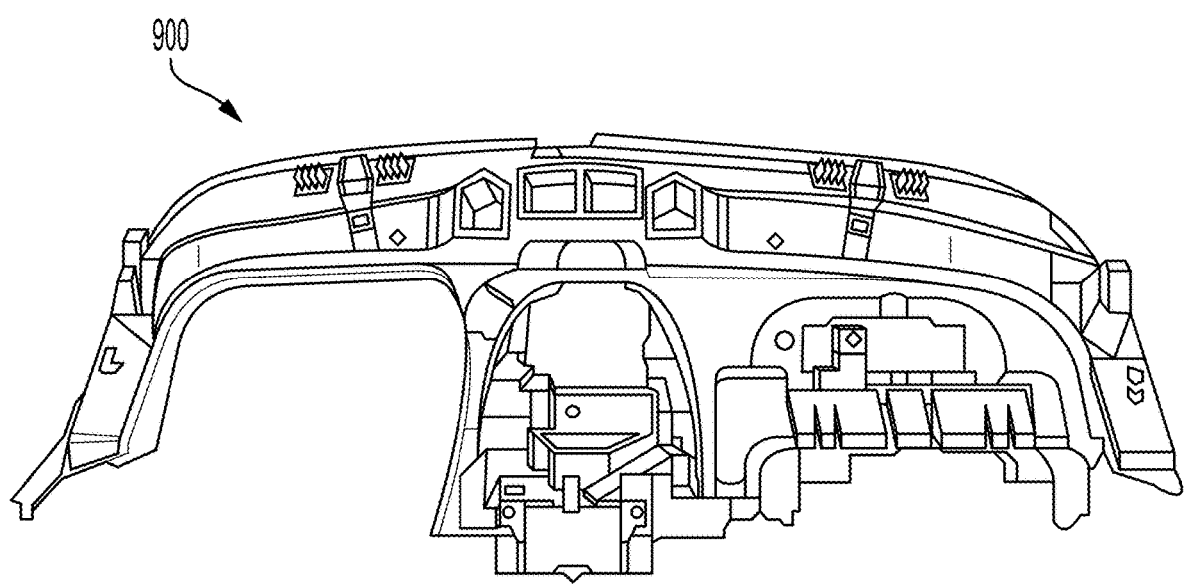
FIG. 9 shows a second example of a structure which may be formed using an embodiment of the polymer composite.
Figure 10:
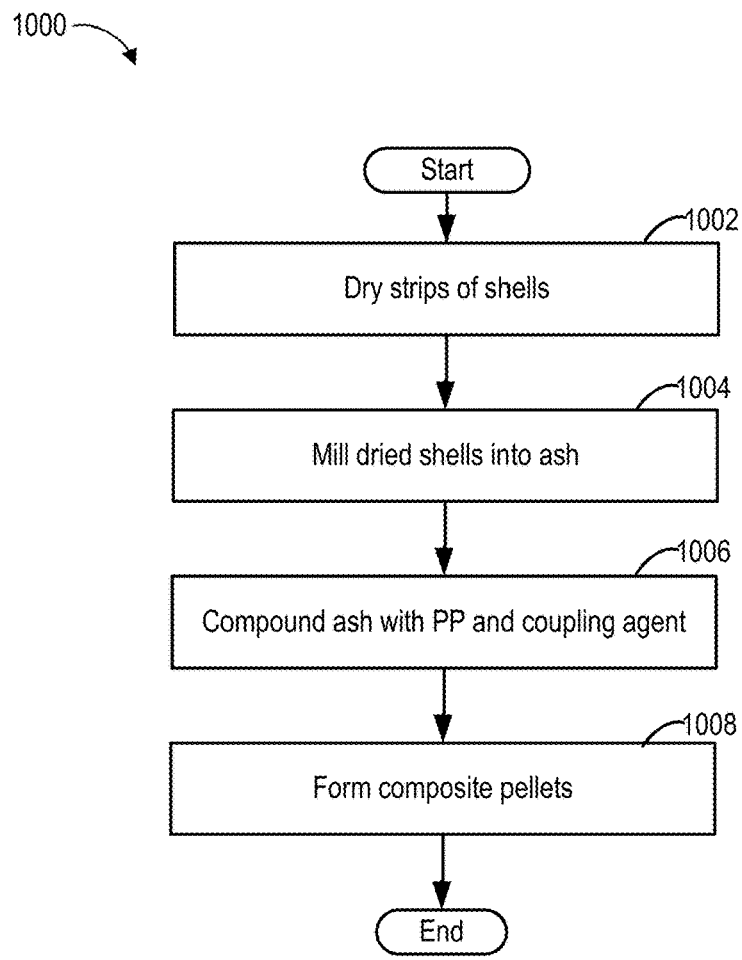
FIG. 10 is an example of a method for forming the polymer composite.
Figure 11:
FIG. 11 shows an example of a shell of a pupunha stem that may be processed to form the polymer composite.

The following description relates to systems and methods for manufacturing and using a polymer composite. Such composites may be used for a variety of different purposes in a variety of different fields including automotive, aerospace, construction, sports, shipbuilding, chemical and special engineering, medicine and the like. An example of an automobile interior with components utilizing the polymer composite is shown in FIG. 1. In some embodiments, the polymer composite may include a plastic component, such as polypropylene (PP) reinforced with a natural fiber. The natural fiber may be extracted from pupunha shells and leaves and incorporated in the PP to form pellets of the pupunha fiber-reinforced polymer composite, as depicted in FIG. 2. The pellets may be processed to form various structures with desired mechanical properties provided by the pupunha fiber-reinforced polymer composite. The mechanical properties of the pupunha fiber reinforced polymer composite are plotted in graphs shown in FIGS. 3-7 and 13-14. Examples of structures which may be formed from the pupunha fiber-reinforced polymer composite are shown in FIGS. 1, 8 and 9. A method for processing the pupunha shells and leaves into the pupunha fiber-reinforced polymer composite as a material for forming structures is depicted in FIG. 10. An example of a shell from a stem of a pupunha palm is depicted in FIG. 11 with a portion of an outer layer of the shell removed to reveal an inner layer of the shell. SEM images of pupunha fibers after drying and milling are shown at different magnifications in FIG. 12.

Polymer composites may be formed of a polymer component and a reinforcing component. The polymer may be a type of plastic, rubber, resin, etc. that lends rigidity and durability to the polymer composite. In some aspects, the polymer may be a thermoset or thermoplastic. Exemplary thermosets or thermoplastics include, but are not limited to, acrylic, ABS, nylon, PLA, polybenzimidazole, polycarbonate, polyetherether ketone, polyetherimide, polyethylene, polyphenylene oxide, polyphenylene sulfide, polypropylene, polystyrene, polyvinyl chloride, polyvinylidene fluoride, Teflon, polyester resin, polyurethane, polyuria, vulcanized rubber, bakelite, duroplast, urea-formaldehyde foam, melamine resin, diallyl-pthalate, epoxy, benzoxazines, polyamides, furan resins, silicone resins, thiolyte, or vinyl ester alone or in combination.

As an alternative to synthetic fibers, natural fibers may offer several benefits. The natural fibers may be less abrasive than glass fibers, reducing a demand for maintenance and replacement of manufacturing equipment. The natural fibers may be plant-based and derived from a renewable resource. Furthermore, the natural fibers may be extracted from portions of the plants that are conventionally considered waste, thereby providing a low cost, readily available source of reinforcing fibers.

In one example, the natural fiber may be obtained from the peach palm, or pupunha, a native crop to some regions of South America. Pupunha is a multi-stemmed plant where moderate harvesting of the stems maintains a viability of the plant. Pupunha may be harvested agriculturally for the inner, edible portion of the stem, e.g., the pupunha palm heart. An outer portion, or shell, of the stem which is formed of lingocellulosic fibers, and the pupunha leaves, may be discarded during processing. Thus, pupunha is an attractive candidate to reinforce composite materials due to low weight, biodegradability, high specific strength and modulus of its fibers, and low gas emission during processing. It will be noted that hereafter, the use of the term "shell" refers to the outer layer of the pupunha stem.

A polymer composite, reinforced with a natural fiber, may be used to form structures that are lightweight yet strong and durable across a variety of industrial applications. As one example, the polymer composite may be incorporated into interior components of an automobile. An example of an interior 100 of such a vehicle is shown in FIG. 1. The interior 100 may include various surfaces and structures configured to provide desired structural support, framework, or aesthetics which may be provided by the polymer composite.

For example, a center console 102 of the interior 100 may include a frame formed of the polymer composite. A dashboard 104 may also include at least portions formed of and/or supported by the polymer composite. In addition, at least portions of an inner surface of a door 106 may incorporate the polymer composite. A trim of the door 106 or various compartments or pockets in the door 106 may formed of the polymer composite, for example.

By forming components of the interior 100 from the polymer composite, an overall cost of the vehicle may be reduced, as well as an overall weight of the vehicle, which may contribute to increased fuel efficiency. The reduction in cost may arise from use of abundant natural fibers that are readily collected and processed. As described above, the natural fibers may be obtained from shells of pupunha palm stems and pupunha leaves and may lend desirable mechanical and aesthetic properties to the polymer composite resulting from a composition of the pupunha shell fibers and leaves. The composition of the pupunha shell fibers includes micro-cellulose and lignin. The pupunha leaves include cross-linked micro-cellulose. The pupunha-reinforced composite may be used, for example, in the inner components of the vehicle interior 100 of FIG. 1 but also applied to any structure where a lightweight, durable, low cost material is desired. A process for reinforcing the polymer with the pupunha shell and leaf fibers is shown in a diagram 200 in FIG. 2. The diagram 200 is provided as a general overview of the process for forming a pupunha fiber-reinforced composite and further details of the process are described below, with reference to FIG. 10.

As depicted in FIG. 2, the diagram 200 includes a first step 202, a second step 204, and a third step 206. At the first step 202, pupunha stem shells and leaves may be collected and dried. The shells and leaves may be waste byproducts of pupunha palm harvesting where the edible palm heart is removed from the stem. The shell may be cut lengthwise during extraction of the palm heart, forming strips 208 of pupunha shell fibers with nano-layers of micro-cellulose. The strips 208 may be approximately 0.5 to 5 mm thick. The leaves may be similarly dried.

An example of a pupunha shell 1100 is shown in FIG. 11. The shell 1100 includes an outer, lighter-colored layer of cellulose. In a section of the shell 1100 where the outer layer of cellulose is removed, an inner layer of the shell 1100 may include micro-cellulose fibers. The strips 208 include both the outer and inner layer and both layers may be milled to form a powder.

Returning to FIG. 2, the dried strips 208 may be milled at the second step 204 into a powder or an ash 210. The dried leaves may be added during the milling. The milling may include one or more milling process or step. For example, the dried strips 208 may be milled to a coarse ash in a first milling process and then to a fine ash in a second milling process. However, other examples may include more than two milling steps to obtain varying degrees of fibril size. The ash may be a mixture of fibrous organic material, lignin, and micro-cellulose. For example, the dried strips 208 may have a naturally-occurring outer layer of micro-cellulose fibrils. Upon milling into the ash, the micro-cellulose fibrils are mixed into the ash with other components of the dried strips 208.

Figure 12:
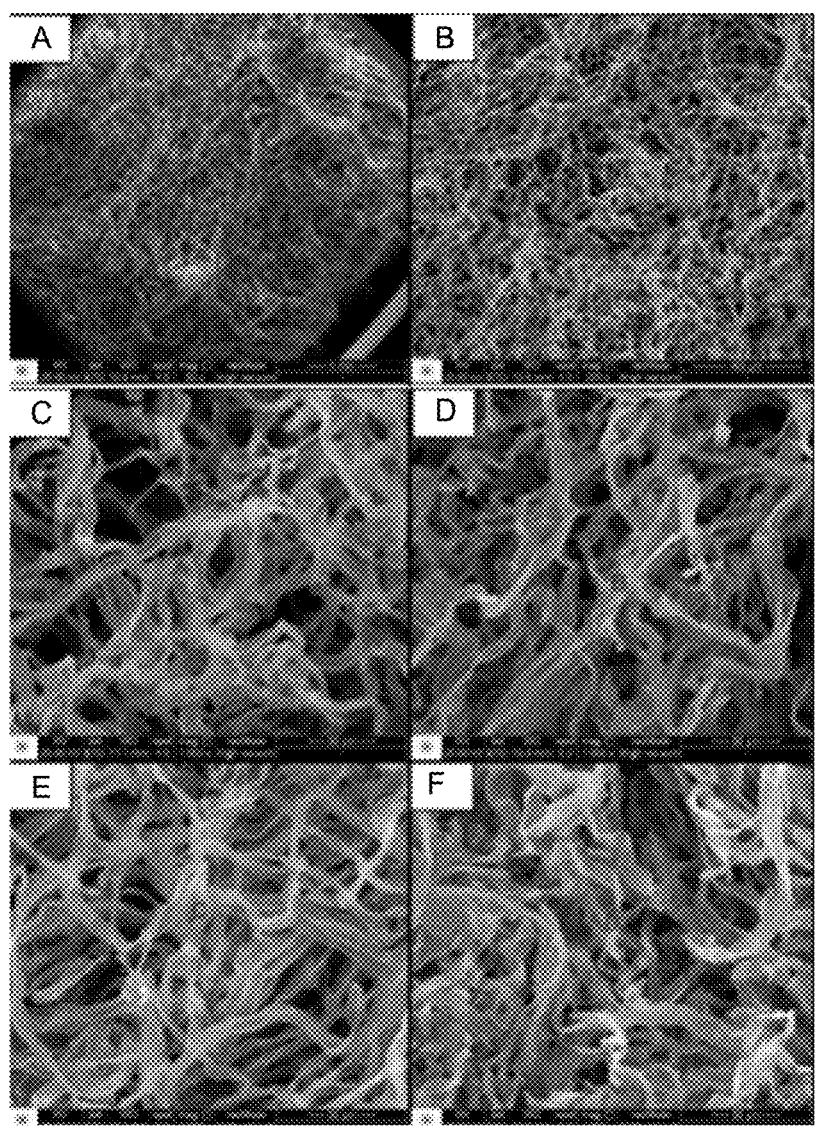
FIG. 12 shows a set of scanning electron microscopy (SEM) images of an ash formed from milling dried pupunha strips.

A set of SEM images of the dried and milled pupunha shell and leaf fibers is shown in FIG. 12. Magnification of the images increases from (A) to (F), beginning at 50× magnification at (A), 200× at (B) and increasing to 1000× at (C), (D), (E) and (F). The higher magnification images (e.g., (E) and (F)) show that the dried and milled pupunha shell and leaf fibers include individual, well-defined strands with widths of 1 μm and lengths between 10 μm to 400 μm. The strands may be micro-cellulose fibrils from the outer layer 1102 of the pupunha shell 1100 shown in FIG. 11.

The ash 210 may be compounded with a polymer and/or a coupling agent to enable cohesion between the ash 210 and the polymer. In one example, the polymer may be PP and the coupling agent may be silane. For example, the polymer may be a high crystallinity PP homopolymer with peroxide additive, available from BRASKEM America, Inc., with a melt flow index of 23 g/10 min. The coupling agent, as another example, may be malic anhydride grafted polypropylene such as BONDYRAM® modified polymer resin configured to promote coupling between materials such as natural fiber reinforcements and a polymer matrix. As yet another example, the coupling agent may be a chemically functionalized polypropylene with a high maleic anhydride content and a melt index of 10 g/10 min, melting point of 167° C., and density of 0.905 g/cm$^3$, such as OREVAC® CA100/CA100N. The mixture may include a relatively low concentration of the coupling agent, such as 3% to circumvent effects of the coupling agent on mechanical properties of a resulting polymer composite.

Other additives may be included in the mixture, such as anti-oxidants, anti-UV, flow, flame-retardants, dispersants, and slip agents, to adjust flow of the compounded mixture. A list of exemplary additives which may be used alone or together include, but are not limited to, those listed in Table 1. It will be appreciated that one or more of the additives shown in Table 1 may added to the compounded mixture in any combination, or more than one of each type of additive may be incorporated. The relative proportions of the additives as well as a total volume of additives added to the mixture may vary according to desired application. For example, when the polymer composite is used to form an exterior component, a higher content of an anti-UV additive may be added to enhance a resistance of the polymer composite to UV light exposure and to weathering. In some examples, a narrower range of additives, such as an anti-oxidant, the anti-UV additive, a flow additive, a dispersant and/or a slip agent, of 0.1-2% may be added to produce a composite with optimized flow.

TABLE 1

List of exemplary polymer composite additives

| Type | Examples | Amount added (%) |
|---|---|---|
| Antioxidant | pentaerythritol tetrakis[3-[3,5-di-tert-butyl-4-hydroxyphenyl]propionate (e.g. IRGANOX ®1010); Tris(2,4-di-tert-butylphenyl) phosphite (IRGAFOS ®168); sterically hindered phenols or benzoates; poly-ether and polyester-based flexible foams (e.g., IRGASTAB ® PUR 67); (1,1-Di-tertutyl)-4-hydroxyphenypmethyl) ethylphosphonate (e.g., IRGANOX ®1425) | 0-5 |
| Anti-UV | Bis(2,2,6,6,-tetramethyl-4-piperidyl)sebaceate (e.g., TINUVIN ® 770) hindered amine light stabilizer; 1,6-hexanediamine, N,N'-bis(2,2,6,6-tetramethyl-4-piperidinyl)-polymer with 2,4,6-trichloro-1,3,5-triazine, reaction products with N-butyl-1-butunatnine and N-butyl-2,2,6,6-tetramethyl-4-piperidinamine (e.g., Chimassorb ®2020); hindered amine derviate (e.g., TINUVIN ® XT 55) | 0-5 |
| Slip agent | erucamide; oleamide; behelamide; vegetable-derived additive (e.g., CRODA ® Incroslip ™ G); high molecular weight siloxane with polypropylene homopolymer (e.g., HMB-0221 Masterbatch-polisiloxane) | 0-5 |
| Dispersant | hydroxyfunctional carboxylic acid ester with pigment affinic groups (e.g. BYK ®-P 4102) | 0-5 |
| Impact modifier | ethylene propylene diene monomer rubber, ethylene vinyl acetate copolymer | 0-10 |
| Short glass fibers | PERFORMAX ® 249A or 248A | 0-50 |
| Mineral talcum | | 0-30 |
| Mineral mica | KAl$_2$Si$_3$O$_{10}$ (OH)$_2$•5H$_2$O, Muscovite Mica (e.g. HiMod-360 mica) | 0-30 |
| Melt flow resin | Homopolymer (e.g. BRASKEM ® H155) MFI of 1250 g/10 min @ 2.16 kg/230° C.) | 1-30 |
| Flame retardant | Monomeric N-alkoxy hindered amine (e.g., FLAMESTAB ® NOR 116) | 0-5 |

PP may be a desirable polymer for various industrial applications due to, for example, its chemical resistance to organic solvents and diluted acids and bases, elasticity, fatigue resistance, relatively high melting point, low cost and low mass. By reinforcing PP with natural fibers, such as the pupunha shell and leaf fibers, a toughness behavior, strength, and stiffness of PP may be enhanced. The pupunha ash/PP/silane mixture may be formed as pellets 212 with the ash homogeneously dispersed into the PP at the third step 206 of the flow diagram 200. The pellets may have lengths of approximately 2-3 mm and diameters of approximately 3.2 mm, for example. In other examples, the pellets may have lengths between approximately 1-5 mm and diameters between approximately 2-4 mm. The pellets may be further processed via a polymer processing technique such as injection molding to form a desired structure.

The mechanical properties of the pupunha fiber-reinforced PP composite may be tuned and optimized depending on the intended purpose by varying the amount of pupunha fiber incorporated into the PP. In some aspects, the composite pellets may be injected into the 100-ton injection molding machine for mechanical testing and evaluated according to testing parameters shown in Table 2.

TABLE 2

Testing methods for PP compound reinforced with pupunha fibers

| Test Name | Method | Condition | Specimen Type |
|---|---|---|---|
| Water Absorption | ISO 62 | 24 h immersion | 50 +/− 1 mm diameter, 3.2 +/− 0.2 mm thickness |
| Density | ISO 1183 | Method A | Pellets |
| Tensile Strength | ISO 527-1 & 2 | 50 mm/minute | 150 minimum × 10 1 4.0 +/− 0.2 mm |
| Flexural Modulus | ISO 178 | 2 mm/minute | 80 × 10 × 4.0 +/− 0.2 mm |
| Impact Strength, notched Charpy | ISO 179-1/1eA | 23° C. | 80 × 10 × 4.0 +/− 0.2 mm |
| Elongation at yield | ISO 527-1&2 | 50 mm/minute | 150 minimum × 10 1 4.0 +/− 0.2 mm |
| Tensile Modulus | ISO 527-1 & 2 | 50 mm/minute | 150 minimum × 10 1 4.0 +/− 0.2 mm |

Comparison of test results for pure PP and PP composites with varying pupunha fiber content are shown in Tables 3-6 and FIGS. 3-7 and 13-14.

Water absorption of the PP and PP composites were tested by drying the PP and composites at 120° C. for 48 hours, in accordance with standard ISO 62 (version 2008). The PP and composites were then exposed to air with 50% relative humidity for 24, 48, 72, and 96 hours and weights of the exposed specimens compared to the dry weights.

Figure 13:
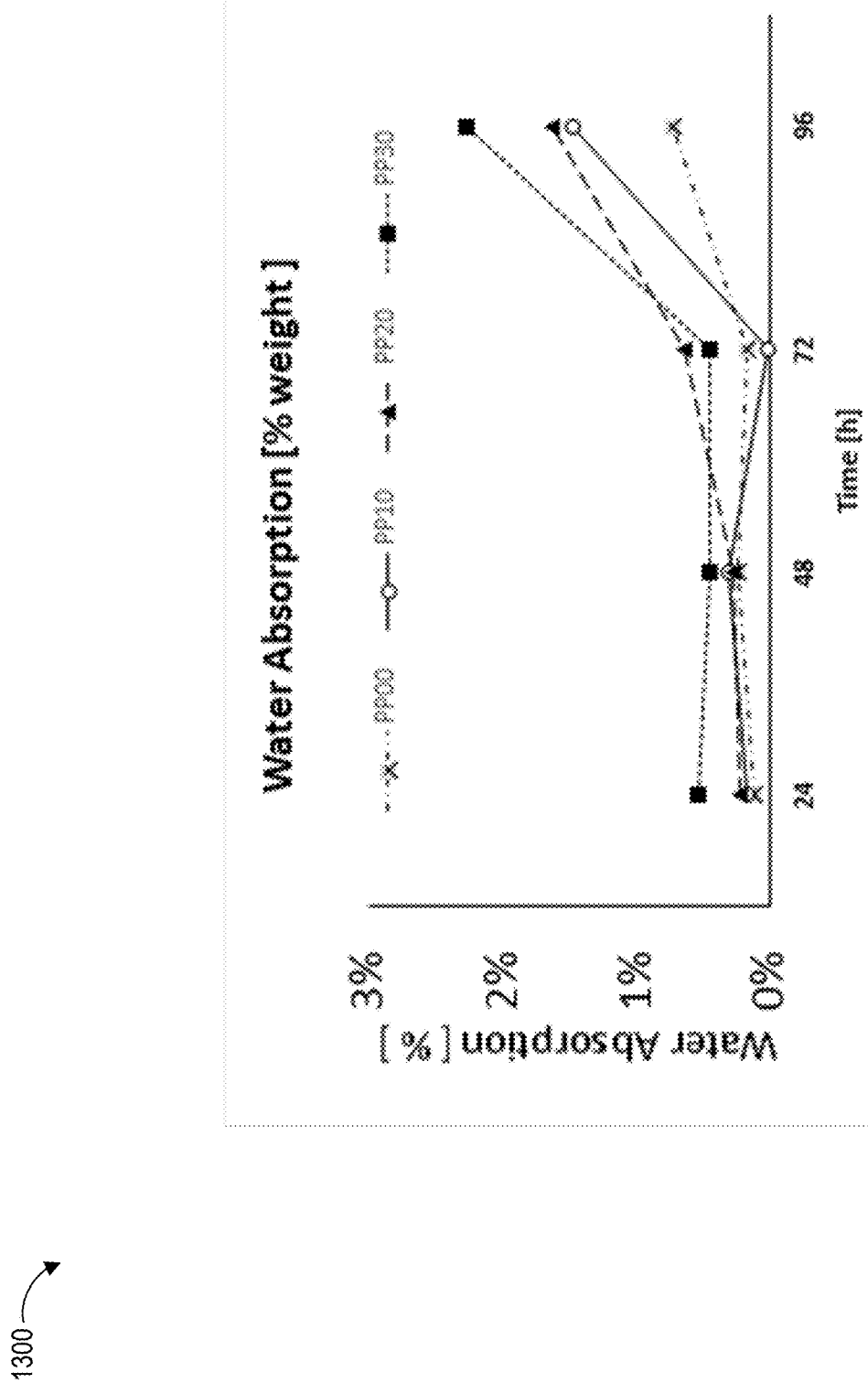
FIG. 13 shows a sixth graph plotting water absorption of polymer composites with various amounts of pupunha fiber.

As shown in Table 3 and plotted in graph 1300 in FIG. 13, an amount of water absorbed by the composites is higher than the pure PP. Water absorption increases with pupunha fiber content with the 30% pupunha fiber-reinforced composite absorbing more than triple the weight content of water than the pure PP.

TABLE 3

Water Absorption of Pupunha Fiber-reinforced PP Composites

| % Pupunha Fiber | 24 h | 48 h | 72 h | 96 h |
|---|---|---|---|---|
| 0 | 0.115% | 0.242% | 0.164% | 0.735% |
| 10 | 0.165% | 0.314% | 0.020% | 1.466% |
| 20 | 0.230% | 0.279% | 0.646% | 1.621% |
| 30 | 0.535% | 0.456% | 0.456% | 2.270% |

Density was measured in accordance with standard ISO 1183 method A (version 2019). The PP and the composite specimens were weighed in air while suspended with a wire. The specimens were then immersed in water while suspended by the wire, the water contained in a vessel on a support. The temperature of the water was 23° C.±2° C. The immersed specimen was then removed from the water, weighed, and the density calculated based on a specific gravity of the specimen.

Figure 14:
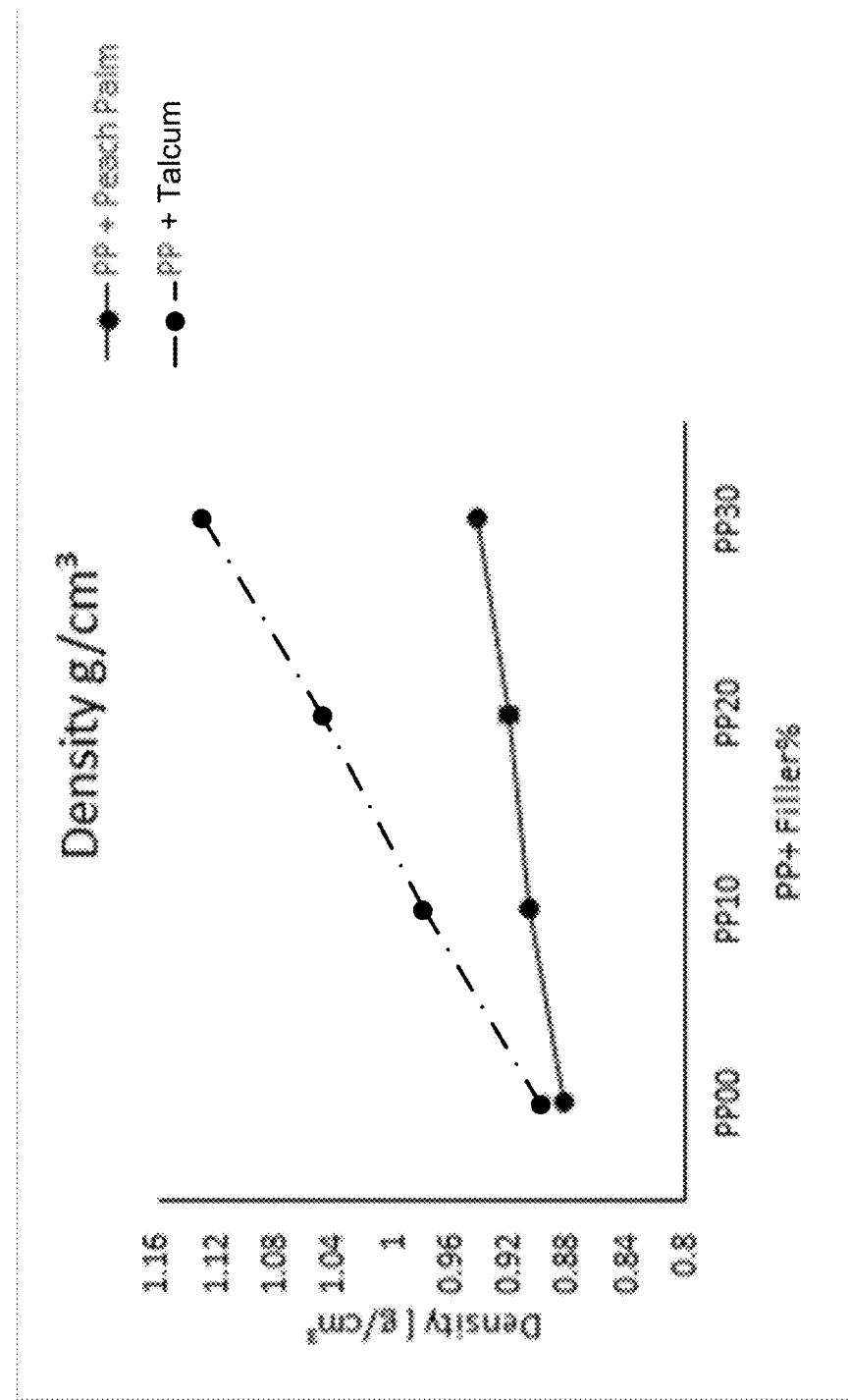
FIG. 14 shows a seventh graph plotting density of polymer composites with various amounts of pupunha fiber and polymer composites with various amounts of talcum.

The results shown in Table 4 and plotted in FIG. 14 in graph 1400 indicate that the composites have higher densities than the pure PP. In addition, increasing pupunha fiber content increases the density of the composite. However, the increases in density for the 10% and 20% pupunha fiber-reinforced composites are relatively small at 3% and 4%. Furthermore, as shown in graph 1400, the densities of the pupunha fiber-reinforced composites are lower than talcum-reinforced PP composite with similar percentages of talcum.

TABLE 4

Density of Pupunha Fiber-reinforced PP Composites

| % Pupunha Fiber | Density | Standard Deviation | Changes from PP |
|---|---|---|---|
| 0 | 0.883 | ±0.002 | — |
| 10 | 0.907 | ±0.003 | 3% |
| 20 | 0.926 | ±0.006 | 4% |
| 30 | 0.943 | ±0.002 | 7% |

The flexural modulus was measured by a deflectometer applying a three-point bend fixture method at a rate of 2 mm/min using Emix (DL 2000) equipment, in accordance with the standard ISO 178 (version 2019).

The tensile modulus, tensile strength, and elongation at yield were determined at a test speed of 50 mm/min in accordance with standard ISO 527-1 (specimen type A) using an extensometer. Specimens were placed in a universal tester at a specified grip separation and pulled until failure. For testing according to standard ISO 527-2, specimen type 1A was used (150 minimum, 75 mm gage length, width and thickness, respectively, of 10×4.0+/−0.2 mm).

TABLE 5

Mechanical Properties of Pupunha Fiber-reinforced PP Composites

| % Pupunha Fiber | Tensile Strength at Yield (MPa) | Elongation at Yield (%) | Tensile Strength (Max Load) (MPa) | Tensile Modulus (MPa) |
|---|---|---|---|---|
| 0 | 17.16 ± 3.93 | 1.15 ± 0.24 | 31.25 ± 2.45 | 1248 ± 147 |
| 10 | 15.10 ± 2.07 | 1.90 ± 0.74 | 22.68 ± 2.32 | 1638 ± 43 |
| 20 | 18.01 ± 1.85 | 0.99 ± 0.04 | 26.25 ± 1.23 | 1837 ± 137 |
| 30 | 17.47 ± 3.70 | 0.81 ± 0.03 | 27.05 ± 1.43 | 2121 ± 123 |

Figure 4:
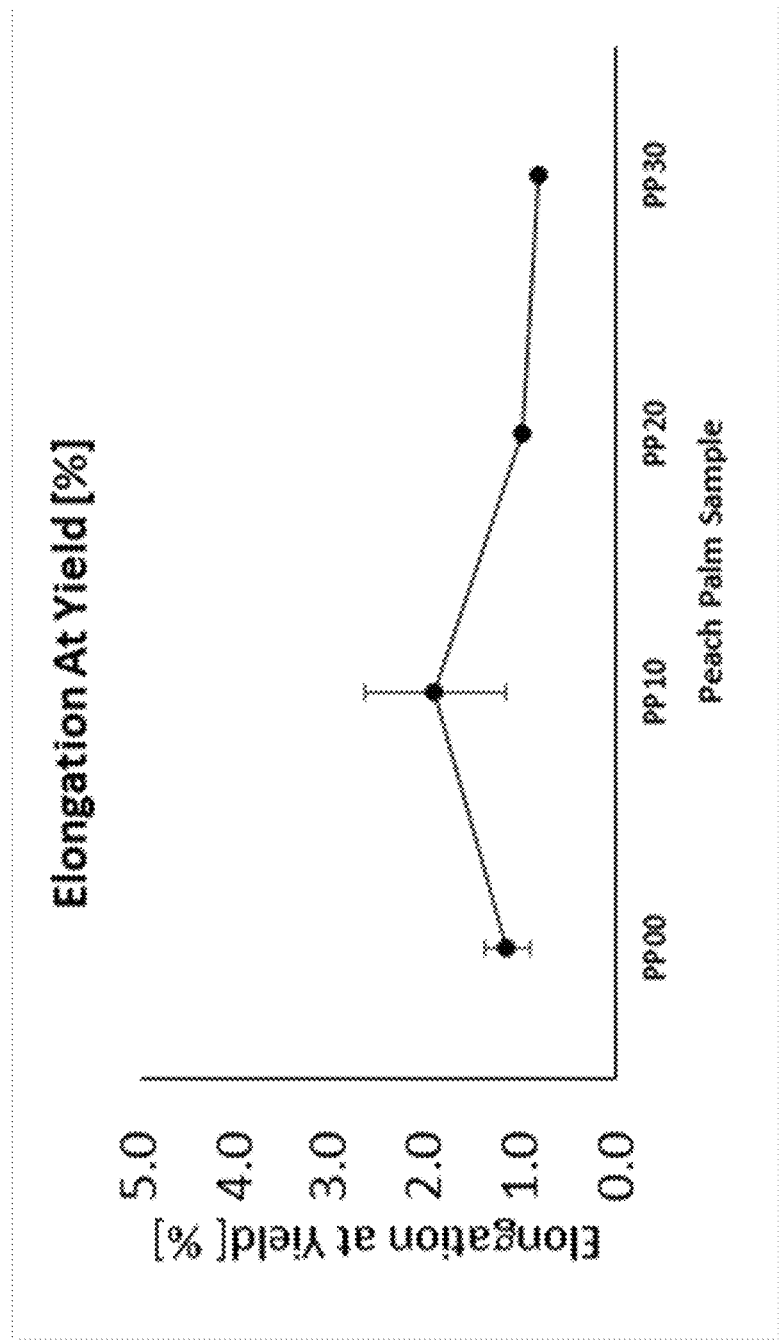
FIG. 4 shows a second graph plotting elongation at yield of polymer composites with varying amounts of pupunha fiber.
Figure 5:
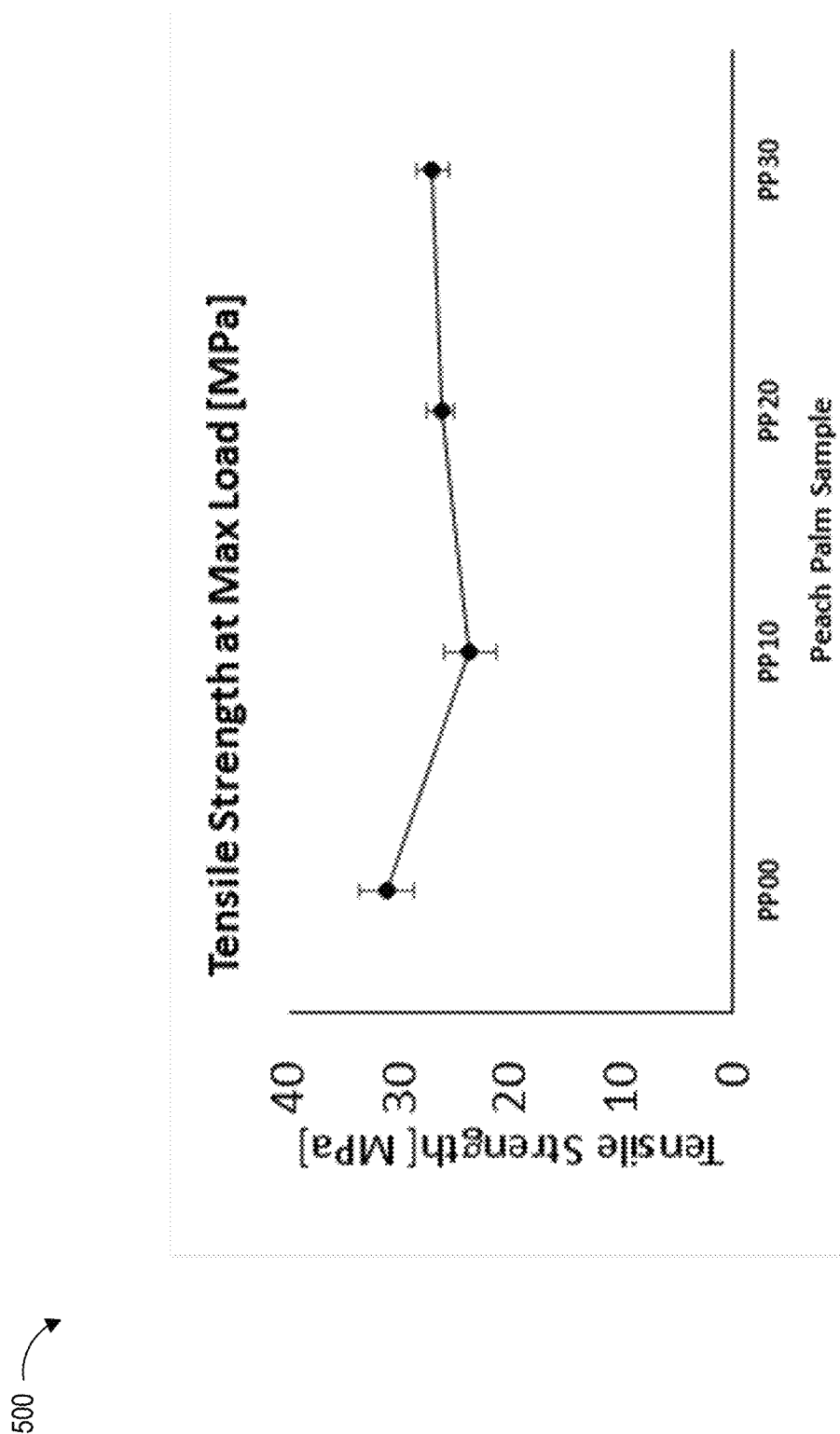
FIG. 5 shows a third graph plotting tensile strength at maximum load of polymer composites comprising increasing amounts of pupunha fiber.
Figure 6:
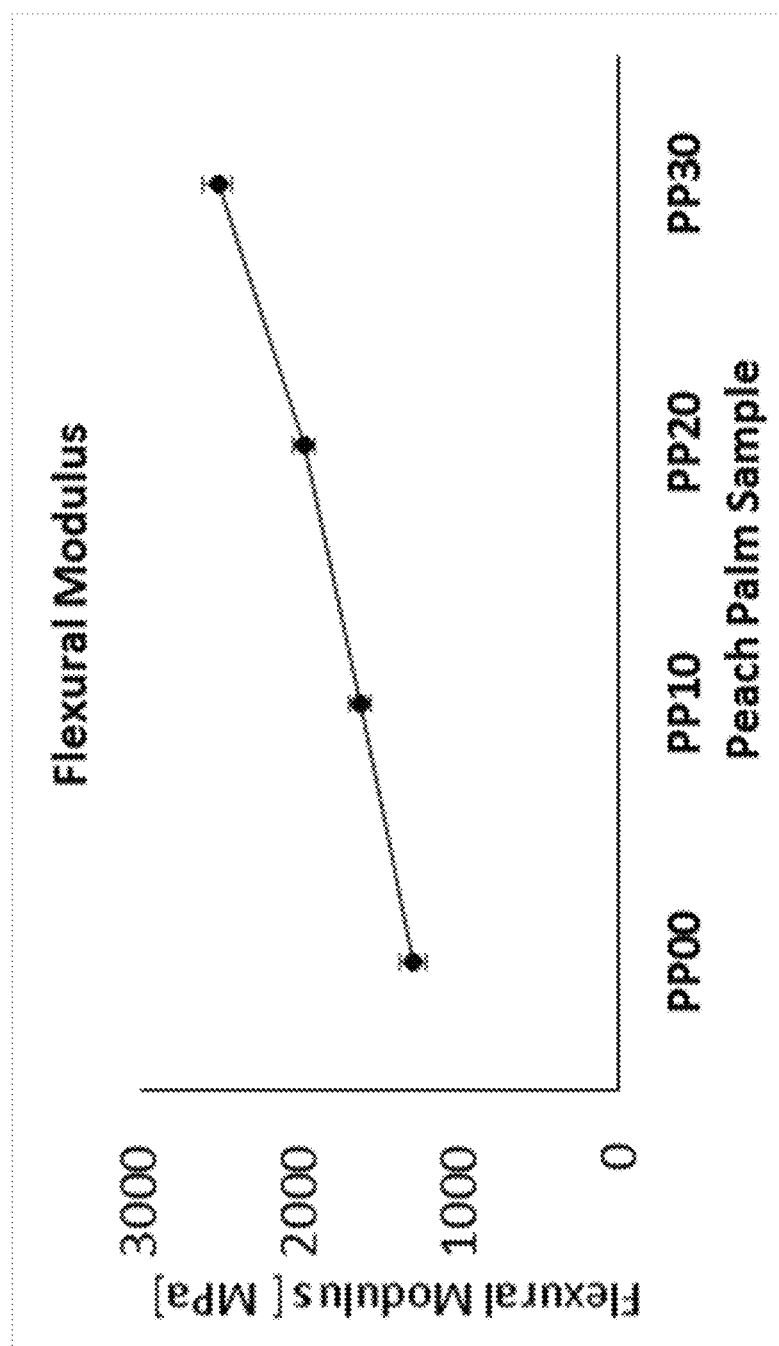
FIG. 6 shows a fourth graph plotting flexural modulus of polymer composites comprising various amounts of pupunha fiber.
Figure 7:
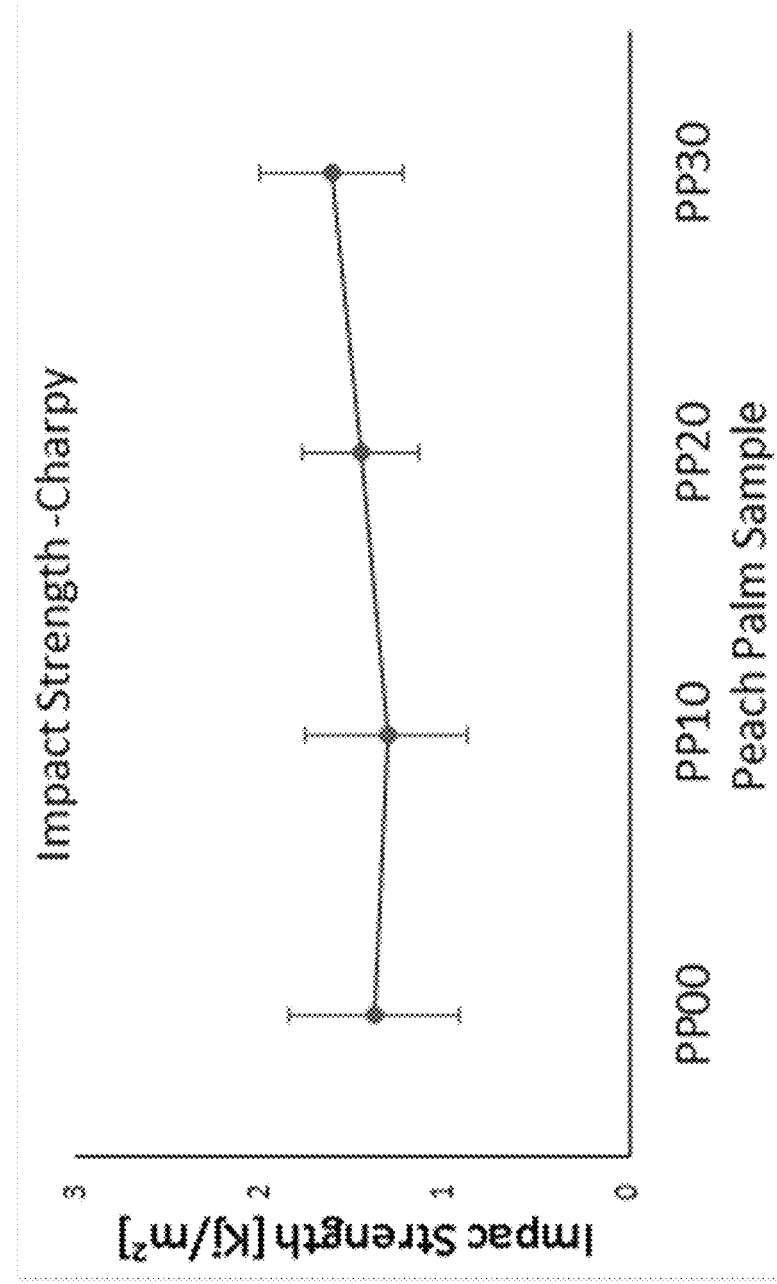
FIG. 7 shows a fifth graph plotting impact strength of polymer composites with various amounts of pupunha fiber.

The results depicted in Table 5 show that an ability of the composite to withstand tension and retain its shape is enhanced. The tensile strength at yield decreases with 10% pupunha fiber in comparison to pure PP, but becomes similar to that of pure PP, as shown in Table 5 and in FIG. 3 in graph 300 depicting tensile strength at yield versus % pupunha fiber. Elongation of the composites at yield is shown in Table 5 and in FIG. 4 in graph 400. As shown in FIG. 4, the elongation at yield increases with 10% pupunha fiber relative to pure PP but decreases to slightly below the elongation at yield for pure PP with higher content of pupunha fiber, indicating that the composite becomes more resistant to elongation with increasing pupunha fiber content. The tensile strength at maximum load, as shown in Table 5 and in FIG. 5 in graph 500, increases with increasing percent content of pupunha fiber. Similarly, the tensile modulus, as shown in Table 5, increases as the amount of pupunha fiber incorporated into the composites increases. Thus, a balance between desired weight of the PP composite, as determined by composite density, and desired tensile strength may be obtained by selecting a corresponding proportion of pupunha fiber. The PP and PP composites were subjected to the Charpy impact test according to standard ISO 179-1 notching type 1eA (version 2000) and notching type A (version 2010). The composites were tested at 23° C. and conditioned for 6 hours prior to testing.

TABLE 6

Additional Properties of
Pupunha Fiber-reinforced PP Composites

| % Pupunha Fiber | Flexural Modulus (MPa) | Impact Strength Charpy (kJ/m$^2$) |
|---|---|---|
| 0  | 1287 ± 88  | 1.39 ± 0.46 |
| 10 | 1620 ± 68  | 1.32 ± 0.44 |
| 20 | 1979 ± 69  | 1.46 ± 0.32 |
| 30 | 2518 ± 89  | 1.62 ± 0.39 |

Additional properties of the pupunha fiber-reinforced PP composites are shown in Table 6. A flexural modulus of the composites, as depicted in Table 6 and in FIG. 6 in graph 600, increases as pupunha fiber content increases. As shown in Table 6 and in FIG. 7 in graph 700, an impact strength of the composites, according to Charpy impact testing, decreases with 10% pupunha fiber, but becomes similar in strength to pure PP with increasing pupunha fiber percentage. The results provided in Table 6 indicate that a resistance to bending of the composites increases as pupunha fiber content increases while a ductility of the composites, with the exception of 10% pupunha fiber, remains relatively constant compared to PP. A PP composite may therefore be adapted to be less prone to deformation by increasing the pupunha fiber content while maintaining the toughness of the composite.

As shown at the third step 206 in FIG. 2, the PP composite, reinforced by pupunha fibers, may be pelletized. Within the pellets, pupunha fiber fibrils with diameters of 1 µm and lengths of 10 µm, for example, are dispersed homogeneously through the PP matrix. In other examples, the fibrils may have diameters between approximately 0.5-2 µm and lengths between approximately 7-13 µm. By milling the pupunha ash into fibrils rather than maintaining the fibers in as longer filaments, mechanical reinforcement provided by the pupunha fibers does not have any directional bias and is uniform throughout the composite. In addition, the fibrils bind with the PP more readily than longer filaments of fiber. As any specific alignment of the pupunha fibers within the PP matrix is precluded, the composite pellets may be processed via a variety of low cost techniques to fabricate structures while maintaining a uniform structural integrity and strength throughout the product.

For example, the pellets may be processed via a method such as injection molding to form a product. During processing, the pellets may be melted, thereby mixing the molten pellets and losing any initial alignment of the pellets prior to forming a final structure. By enabling the pupunha fiber-reinforced composite to be injection molded, a high volume of products formed from the composite may be readily manufactured at low cost. Furthermore, a tunability of mechanical properties of the composite, as enabled by adjusting a percentage of pupunha fibers in the composite may increase a range of products in which the composite may be used.

Final processing steps of the pupunha fiber-reinforced composite may form structures having translucent brown tint with a visible pattern formed by the fibers. The composite may have a medium gloss level as determined by standard testing for specular gloss (ASTM D523) using a glossmeter. An aesthetic of the composite may allow the composite to appear similar to a wood finish. Thus, in addition to providing structural support as a framework for a component, the composite may also be used to form external surfaces of the component. The glossy, tinted appearance of the composite may preclude additional treatment of the component such as painting, staining, varnishing, etc. Adjusting an amount of the pupunha fiber in the composite may vary an intensity of the fiber pattern.

Examples of automotive components which may be formed from the pupunha fiber-reinforced composite are shown in FIGS. 8 and 9. However, the automotive components shown in FIGS. 8 and 9 are non-limiting examples and it will be appreciated that the pupunha fiber-reinforced composite may be used to form a variety of structures for different applications other than automotive components. A first example 800 of a pupunha fiber-reinforced component is illustrated in FIG. 8. The first example 800 may be a console 800 of a vehicle, supporting vehicle controls, such as gear stick, of the vehicle. The console 800 may form a variety of storage compartments in addition to providing surfaces for instrumentation such as various displays and accessory controls. As such, it is desirable to form the console 800 from a durable, strong, lightweight material, such as the pupunha fiber-reinforce composite. The composite may include approximately 5-70% by weight of pupunha fibers. In some examples, the composite may include up to 70% by weight of pupunha fibers, e.g., when the composite is to be injection molded. For other processing techniques, between approximately 5-40% pupunha fiber content (by weight) may be included in the composite, depending on the particular techniques applied. Furthermore, the pupunha fiber-reinforced composite may lend the console 800 a glossy, wood-like appearance and may be used to form outer surfaces of the console 800 as well.

A second example 900 of a pupunha fiber-reinforced component is depicted in FIG. 9. The second example 900 may be an HVAC housing 900 for a vehicle. The HVAC housing 900 may be installed in a front end compartment of the vehicle. Thus, the HVAC housing 900 may be in contact with HVAC fluids and subject to large temperature differentials. Thus a non-reactive, resilient material with a sufficient amount of elasticity to withstand oscillations induced by vehicle movement may be used to form the HVAC housing 900. Furthermore, a fuel economy of the vehicle may be increased by utilizing a lightweight material, e.g., the pupunha fiber-reinforced composite, to form the HVAC housing 900. The composite may also include approximately 5-40% by weight of pupunha fibers when incorporated in to the HVAC housing 900.

A method 1000 for forming a pupunha fiber-reinforced PP composite is shown in FIG. 10. The resulting composite may be used to form a variety of structures, including automotive components such as the examples shown in FIGS. 8 and 9. The pupunha fibers may be obtained from stems and leaves of the pupunha palm during harvesting of the pupunha palm for the edible hearts, as shown in FIG. 2. Discarded shells that surround the hearts may be collected and delivered to a manufacturing operation for further processing, as described below in method 1000.

At 1002, the method includes drying the shells, which may be split into strips, as well as the leaves. The shells and leaves may be dried by allowing the shells and leaves to sit under low humidity conditions for a period of time, such as 7 days. In some examples, the shells and leaves may be subjected to elevated temperature or exposed to vacuum. The dried shells and leaves may be milled into a powder, or ash, at 1004. Milling the shells and leaves may include applying mechanical force to the shells and leaves via, for example, a pelletizer mill followed by milling in a knife mill. However, various other milling methods, such as ball or rod mills, may be used to pulverize the strips of pupunha materials into fibrils. In one example, the fibrils may have diameters of 1 μm and lengths of 10 μm. The resulting ash may be a mixture of lignin, fibers, and microcellulose which may be dried in an oven. For example, the ash may be dried at 80° C. for 8 hours after milling.

At 1006, the method includes compounding the ash with PP and a coupling agent. Compounding may alter characteristics of the PP by melt blending the PP with a target amount of the pupunha ash along with the coupling agent to enhance binding between the PP and ash. The compounded mixture forms a composite with a PP matrix or base. As an example, the composite may include about 5-40% pupunha ash and about 3% of the coupling agent by weight. The coupling agent may be a maleic anhydride grafted polypropylene coupling agent, for example.

Pellets of the compounded PP, pupunha ash, and the coupling agent, may be formed at 1008. The pellets may be formed by using, for example, a double twin screw extruder with a 30 mm screw diameter and barrel length of about 1500 mm. The pellets formed by the double twin screw extruder may have lengths of about 2-3 mm and diameters of about 3 mm. The extruder may be operated with a production rate of 10 Kg/h, screw rotation of 200 rpm, and with 12 heating zones with temperatures ranging between 180 to 200° C. The composite pellets may then be used as a raw material for further processing to form a desired product. For example, the pellets may be injection molded, blow molded, rotational molded, etc., to form automotive components.

EXAMPLES

Example 1

Polymer Composite Formation

A pupunha-reinforced polymer composite is prepared by cutting pupunha stems lengthwise into strips allowing them to dry at room temperature for seven days under low humidity. Once dried, the strips are partially milled in a pelletizer mill to break down the strips into long filaments and then milled again in a MECANOFAR® knife mill (Brazil) to form fibrils. The resulting powder is dried in a mechanical oven at 80° C. for 8 hours. The powder is mixed with BRASKEM® PP $H_2O_2$ HC (Braskem, Brazil) and BONDYRAM® PPG MAH (Polyram Plastic Industries LTD., Gilboa, Israel) at 10 wt %, 87 wt % and 3 wt %, respectively, in a Kraus Maffei ZE 30 double twin screw extruder (Munich, Germany) with a 30 mm screw diameter and 1500 mm barrel length. The extruder is operated with a production rate of 10 Kg/h, screw velocity of 100 rpm, side feeding speed of 200 rpm and heated through 12 heating zones (Z1 to Z12). The extruder is heated to 30° C. at Z1, to 180° C. at Z2, to 190° C. through Z3 to Z5, to 195° C. through Z6 to Z9, and to 200° C. through Z10 to Z12. After reaching Z12, the molten polymer composite is extruded into pellets of 2-3 mm in length and 3.2 mm in diameter. The pellets are injected into an injection molding machine to be molded into a target structure. The finished structure has a smooth, medium gloss finish and a brownish color with visible fibers.

In this way, a lightweight composite with enhanced strength and an appealing visual appearance may be reinforced by a low cost, renewable material. The composite may be formed from a PP base with pupunha fibers dispersed into the PP matrix. The pupunha fibers may be milled into a powder prior to mixing with the PP to form a homogeneous material which may be processed via low cost plastic manufacturing methods. By incorporating the pupunha fibers into the PP as fibrils, a structure formed from the composite may have uniform mechanical properties regardless of processing technique. Furthermore, the mechanical properties of the composite may be readily tuned by adjusting a content of the pupunha fibers.

The technical effect of forming a composite from PP and pupunha fibers is that a strength and durability of the PP is increased without incurring additional costs or complexity of manufacturing.

In one embodiment, a composite material includes a polymer base, and a fine powder with fibrils of microcellulose formed from milled and dried pupunha fibers, wherein the composite material is provided as pellets. In a first example of the composite material, the polymer base is polypropylene. A second example of the composite material optionally includes the first example, and further includes, wherein the powder is initially milled to a coarse powder with long filaments, and then milled to the fine powder. A third example of the composite material optionally includes one or more of the first and second examples, and further includes a coupling agent. A fourth example of the composite material optionally includes one or more of the first through third examples, and further includes, wherein the pupunha fibers are obtained from shells of pupunha palm stems and pupunha leaves. A fifth example of the composite material optionally includes one or more of the first through fourth examples, and further includes, wherein the powder is homogeneously dispersed within the polymer base and wherein the powder is a mixture of lignin, fibers, and microcellulose. A sixth example of the composite material optionally includes one or more of the first through fifth examples, and further includes, wherein the pellets include between 5-40% by weight of the powder. A seventh example of the composite material optionally includes one or more of the first through sixth examples, and further includes, wherein the composite material has a medium gloss finish with an appearance similar to wood.

In another embodiment, a natural fiber-reinforced composite includes pupunha fibers dispersed into a polypropylene matrix as a powder, wherein the pupunha fibers are extracted from a stem shell and leaves of a pupunha plant. In a first example of the composite, the natural fiber-reinforced composite is provided as pellets for further processing. A second example of the composite optionally includes the first example, and further includes, wherein a density of the natural fiber-reinforced composite is between 0.907 to 0.943 $g/cm^3$. A third example of the composite optionally includes one or more of the first and second examples, and further includes, wherein a tensile strength at yield of the natural fiber-reinforced composite is between 15.10-18.01 MPa. A fourth example of the composite optionally includes one or more of the first through third examples, and further includes, wherein an elongation at yield of the natural fiber-reinforced composite is between 0.8-1.9%. A fifth example of the composite optionally includes one or more of the first through fourth examples, and further includes, wherein a tensile modulus of the natural fiber-reinforced composite is between 1638-2121 MPa. A sixth example of the composite optionally includes one or more of the first through fifth examples, and further includes, wherein a flexural modulus of the natural fiber-reinforced composite is between 1620-2518 MPa. A seventh example of the composite optionally includes one or more of the first through sixth examples, and further includes, wherein an impact strength of the natural fiber-reinforced composite is between 1.32-1.62 kJ/m$^2$.

In yet another embodiment, a method includes drying pupunha shells and leaves, milling the pupunha, fibers into a coarse powder, milling the coarse powder into a fine powder, mixing the powder into a polymer, and forming pellets from the mixture of the powder and the polymer. In a first example of the method, pupunha shells and leaves discarded during harvesting of pupunha palm for palm hearts are collected. A second example of the method optionally includes the first example, and further includes, wherein milling the dried pupunha shells and leaves includes partially milling the pupunha shells and leaves into the coarse powder a pelletizer mill and then into the fine powder in a knife mill, followed by drying in an oven at 80° C. A third example of the method optionally includes one or more of the first and second examples, and further includes, wherein mixing the powder into the polymer includes compounding the polymer with the powder and a coupling agent with a double twin screw extruder and heating the extruder through 12 heating zones at temperatures between 180-200° C. and wherein the polymer is polypropylene.

As used herein, the term "approximately" or "about" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A composite material comprising:
   a polymer base; and
   fibrils of micro-cellulose formed from milled and dried pupunha fibers and having diameters within a first range of 0.5 to 2 μm and lengths within a second range of 7 to 13 μm;
   wherein the composite material is provided as pellets.

2. The composite material of claim 1, wherein the polymer base is polypropylene.

3. The composite material of claim 1, wherein the pupunha fibers are milled at least two times to obtain the fibrils with the diameters within the first range and the lengths within the second range.

4. The composite material of claim 1, further comprising a coupling agent.

5. The composite material of claim 1, wherein the pupunha fibers are obtained from shells of pupunha palm stems and pupunha leaves.

6. The composite material of claim 1, wherein the fibrils are homogeneously dispersed within the polymer base and wherein the composite material further includes lignin and fibers.

7. The composite material of claim 1, wherein the pellets include between 5-40% by weight of the fibrils.

8. The composite material of claim 1, wherein the composite material has a medium gloss finish with a brown tint and a visible pattern similar to wood, and wherein the composite material is used to form automotive components including consoles and HVAC housings.

9. A natural fiber-reinforced composite, comprising:
   pupunha fibers dispersed into a polypropylene matrix as a powder, the pupunha fibers having diameters within a range of 0.5 to 2 μm and lengths within a range of 7 to 13 μm, wherein the pupunha fibers are extracted from a stem shell and leaves of a pupunha plant.

10. The natural fiber-reinforced composite of claim 9, wherein the natural fiber-reinforced composite is provided as pellets for further processing.

11. The natural fiber-reinforced composite of claim 9, wherein a density of the natural fiber-reinforced composite is between 0.907 to 0.943 g/cm$^3$.

12. The natural fiber-reinforced composite of claim 9, wherein a tensile strength at yield of the natural fiber-reinforced composite is between 15.10-18.01 MPa.

13. The natural fiber-reinforced composite of claim 9, wherein an elongation at yield of the natural fiber-reinforced composite is between 0.8-1.9%.

14. The natural fiber-reinforced composite of claim 9, wherein a tensile modulus of the natural fiber-reinforced composite is between 1638-2121 MPa.

15. The natural fiber-reinforced composite of claim 9, wherein a flexural modulus of the natural fiber-reinforced composite is between 1620-2518 MPa.

16. The natural fiber-reinforced composite of claim 9, wherein an impact strength of the natural fiber-reinforced composite is between 1.32-1.62 Kj/m$^2$.

17. A method for forming a composite, comprising: drying pupunha shells and leaves; milling the dried pupunha shells and leaves a first time; milling the dried pupunha shells and leaves a second time, wherein after the second milling, fibers formed from the twice milled shells and leaves have diameters within a first range of 0.5 to 2 μm and lengths within a second range of 7 to 13 μm; mixing the fibers into a polymer; and forming pellets from the mixture of the fibers and the polymer.

18. The method of claim 17, further comprising collecting pupunha shells and leaves discarded during harvesting of pupunha palm for palm hearts.

19. The method of claim 17, wherein milling the dried pupunha shells and leaves includes milling the pupunha shells and leaves in a pelletizer mill during the first milling and then in a knife mill during the second milling, followed by drying in an oven at 80° C.

20. The method of claim 17, wherein mixing the fibers into the polymer includes compounding the polymer with the fibers and a coupling agent with a twin screw extruder and heating the extruder through 12 heating zones at temperatures between 180-200° C. and wherein the polymer is polypropylene.

* * * * *